Patented Mar. 17, 1953

2,631,922

UNITED STATES PATENT OFFICE 2,631,922

PROCESS OF PRODUCING NONCOLLOIDAL CALCIUM CARBONATE

Milton O. Schur, Asheville, and Robert M. Levy, Brevard, N. C., assignors to Ecusta Paper Corporation, a corporation of Delaware No Drawing. Application August 3, 1949, Serial No. 108,416

2 Claims. (Cl. 23—66)

This invention relates to the manufacture of calcium carbonate and especially in a form suited for use as a filler in cigarette paper for imparting thereto the desired opacity, porosity, and thickness characteristics.

In our copending application Serial No. 745,728, filed May 3, 1947, we have disclosed and claimed a process of producing calcium carbonate in certain desired particle sizes for use in cigarette paper in connection with the porosity and opacity characteristics of the paper, the process comprising a first step of producing calcium carbonate particle sizes finer than desired for use in the paper and a second step of increasing the particle size of these fine particles so as to obtain the optimum size particles. Our two-step process is a decided improvement in the control of particle size in the finished product over a single-stage process.

Nevertheless, there are characteristics of the calcium carbonate filler, other than particle size, that must be controlled to give the optimum properties in the final high-quality cigarette paper, and while these characteristics are difficult to identify specifically, we believe that they include the varying tendencies of the particles to aggregate, the retention of the filler in the paper finish during the manufacture thereof, the softness of the filler, and the bulking properties of the filler. These are apparently important characteristics, but we do not wish our invention to be limited to them or to any theory of why our new process produces the type of calcium carbonate filler that gives the desired results in the finished cigarette paper.

In our research which led to the present invention, we found that one of the main problems was to produce and reproduce consistently batches of the desired type of calcium carbonate. Despite strict control of the overall process conditions, variations would occur in the quality of the final precipitated calcium carbonate, and the end result in any one batch could not be definitely anticipated. We finally discovered that the carbonating conditions at the very start of carbonation are exceedingly important in determining the quality of the final filler, probably because the particles of calcium carbonate formed at the outset constitute nuclei, the physical-chemical characteristics of which determine the general characteristics of the batch. In short, in the consistent production and reproduction of the desired end product, the most important conditions during carbonation are those at the outset of carbonation. We discovered that the essential condition is to have the slaked lime, calcium hydroxide suspension, initially at a temperature of about 15° C. to 25° C. and preferably at about 20° C. When this initial condition has been established and carbonating of the lime with $CO_2$ begun, the temperature of the mixture may be allowed to rise. Usually the temperatures reach an equilibrium level of about 50° C.–60° C. Once the proper initial relatively low temperature has been established, it is not necessary to maintain that temperature or any fixed low temperature throughout the carbonating reaction. This is contrary to prior beliefs of other workers in this field, as illustrated by the prior art patents that recommend maintaining the temperature during carbonation at a fixed low value or within some specified narrow range of temperatures. Our new discovery in this regard is of substantial commercial value because it avoids the necessity of maintaining a low temperature during the carbonating reaction, which is exothermic, and which would require considerable cooling to absorb the heat of reaction.

We recognize that prior patents disclose processes for obtaining certain characteristics of calcium carbonate by control of the temperature of carbonation and other operating conditions. A typical prior art process of this type involves the maintaining during carbonation of a relatively low temperature of the lime being carbonated, so as to produce a colloidal calcium carbonate. Our present invention fundamentally distinguishes over these prior art processes in that we have found it is not necessary to maintain the low temperature throughout the carbonation reaction, provided the initial temperature is adjusted properly and, also, by permitting the temperature to rise we avoid the production of colloidal calcium carbonate. We have determined from tests that colloidal calcium carbonate is much too fine in particle size to give the above-described desired properties in the cigarette paper and has other undesirable characteristics such as drying to a hard, dense mass. Pursuant to our invention, we definitely avoid the production of colloidal carbonate and instead produce a non-colloidal calcium carbonate, which has substantially larger particle size and dries to a bulky, soft mass.

The initial relatively low temperature essential to our process may be obtained in different ways, such as, for example, by external cooling of the vessel containing the lime slurry or by direct cooling of a thickened, i. e., concentrated, lime slurry with cold water used for dilution to bring it to the proper concentration for carbonating.

Regarding the carbon dioxide gas, which is introduced into the calcium hydroxide suspension for effecting carbonation, as described below, the $CO_2$ concentration will vary with the type of gas used. For example, if flue gas is used, it will contain approximately 8% to 12% $CO_2$, whereas if kiln gas is used, the percentage will vary within the range of about 10% to 30%. The percentage concentration of $CO_2$ in the gas will determine the concentration of the lime slurry to be used. For example, when flue gas is used, the lime concentration, calculated as $CaCO_3$, should be approximately 220 to 280 grams per liter.

The process of our invention will be more clearly understood from the following description of a typical laboratory preparation, and a typical pilot plant production.

Laboratory preparation

A good grade of 1" rotary kiln, high calcium, quicklime was slaked by addition to boiling water in the ratio of 54 lbs. of lime to 33 gal. of water. The lime suspension was slowly agitated for one hour to insure complete hydration of the lime.

Sixteen liters of the above lime slurry were adjusted in concentration to contain 250 grams/liter expressed as $CaCO_3$, then were cooled to 20° C. and were transferred to a small laboratory turbo-carbonator, 12" in diameter. A 10% $CO_2$–90% air mixture was introduced under the surface of the liquid in the turbo-carbonator at the rate of 0.6 C. F. M. The 4" diameter turbo-mixer in the carbonator was rotated at about 500 R. P. M. (The equipment used is sold by the Turbo-Mixer Corporation as 4" laboratory turbo-gas absorber.)

The temperature of the batch was increased by means of a heating coil at the uniform rate of 30° C. increase in temperature in the time required to carbonate one-half of the lime present. This rate of increase in temperature corresponds approximately to the increase obtained in large scale apparatus as a balance between the heat of reaction, on the one hand, and radiation and other heat losses, on the other hand. The temperature was then held at 50° C. for the remainder of the time of carbonation. From time to time, a small amount of water was added to replace that lost by evaporation. About 12 hours was required to convert all of the lime initially present to calcium carbonate.

Handsheets of cigarette paper made with numerous batches of calcium carbonate prepared according to the above procedure and from limes from different localities, consistently gave sheets having opacity, porosity and thickness values satisfactory in commercial made cigarette paper.

Pilot plant production

A good commercial grade of 1" high calcium quicklime burned in a rotary kiln was slaked by the gradual addition to boiling water of 2340 lbs. of lime to 880 gals. of water. The lime suspension was gently agitated with compressed air for several hours to insure complete hydration.

Of the above lime slurry, 7750 gallons were adjusted in concentration so as to contain 250 grams per liter expressed as $CaCO_3$ and were pumped into a 10,000-gal. commercial turbo-carbonator. The lime slurry was then cooled with cooling water sprayed on the outside of the tank to about 20° C. Boiler flue gas containing about 10% $CO_2$ was then added at the rate of about 800 C. F. M. under the surface of the liquid near the blades of the rotating turbine. The turbo-agitator was rotated at about 50 R. P. M. The temperature gradually rose at a relatively uniform rate until a level of about 50° C. was attained. This corresponded approximately to the time when ½ of the lime initially present had been converted to calcium carbonate. The temperature then remained practically constant during remainder of the carbonation period, the heat of reaction evidently being balanced by radiation and other heat losses. The time required to convert all the lime to carbonate was about 18 hours.

Batches of this pilot plant filler were first evaluated with the aid of the laboratory handsheets of cigarette paper. The results obtained were identical with the corresponding filler similarly made in the laboratory as described previously. In contrast with these results, similar batches of calcium carbonate made either in the laboratory or in the pilot plant at a temperature initially above 30° C. gave variable and frequently poor results, when tested in the cigarette paper.

Other methods than those described above for initially cooling the lime slurry prior to carbonation may be employed. They include the use of a continuous centrifuge associated with a rotating discharge screw and operating so as to produce from the hot lime slurry a relatively thick, heavy mass of the hydrated lime, the bulk of the initial water content of the hydrated lime being thrown out by the centrifuge and being recycled, if desired, for use in the slaking of another batch of lime. The discharge screw will slowly feed the dewatered thick mass of hydrated lime away from the centrifuge and into a suitable vessel for dilution of this heavy slurry with process water at sufficiently low temperature to convert the heavy sludge or mass of slaked lime into a watery suspension having a temperature of about 20° C. This procedure, which involves first concentrating the lime slurry by centrifuging, and then diluting the concentrated sludge thus produced with cold water to effect a lowering of the temperature of the entire mass to 20° C., has a definite practical advantage from the heat transfer standpoint. It is difficult to obtain quickly a lowering of the temperature of the center portion of the mass by external cooling. This difficulty is eliminated, however, when cold water is introduced directly into the concentrated mass. This water serves the dual function of reducing the temperature of the resulting suspension to the desired low point and of bringing the lime slurry to the desired concentration.

While the process of our invention has been described hereinabove with particular reference to use of the calcium carbonate, produced by this process, in cigarette paper, in which it has a special value, it is to be understood that the process may be utilized for producing carbonates for other end uses within the scope of our invention. In fact, in any case where it is desired to reproduce consistently a predetermined type of precipitated calcium carbonate, this process may be employed. Once the desired particle size and other characteristics of the calcium carbonate are determined, this product can be reproduced much more consistently by means of the process of our present invention than by any other known process, and as described above our process is particularly characterized by the use of the initial cooling of the lime slurry to a temperature within the approximate range of 15° C. to 25° C., and then permitting the temperature to rise during the carbonating procedure.

Our process is used to advantage whether or not the filler is made in one carbonating step, or by the two-step carbonating method described in our copending application Serial No. 745,728, filed May 3, 1947. In either case, the method described herein possesses the important advantage of leading more consistently than heretofore to the reproduction of the final qualities desired in the calcium carbonate.

The scope of our invention is indicated in the appended claims.

We claim:

1. The process of controlling the characteristics of precipitated calcium carbonate so as to render it especially suitable for use as a filler in cigarette paper comprising first, slaking quicklime, next cooling the slaked lime slurry to a temperature of approximately 15° C. to 25° C., then adjusting the concentration of the cooled slurry to approximately 220 to 280 grams per liter, expressed as calcium carbonate, introducing gas, containing approximately 8% to 12% carbon dioxide, into this slurry to effect an exothermic carbonation reaction between the slurry and the carbon dioxide, continuing this exothermic reaction on a gradually increasing temperature scale to an equlibrium value of about 50° C. to 60° C. until substantially all of the lime has been converted into calcium carbonate of a non-colloidal form.

2. The process of controlling the characteristics of precipitated calcium carbonate so as to render it especially suitable for use as a filler in cigarette paper comprising first, slaking quicklime, next cooling the slaked lime slurry to a temperature of approximately 20° C., then adjusting the concentration of cooled slurry to approximately 220 to 280 grams per liter, expressed as calcium carbonate, introducing gas, containing approximately 8% to 12% carbon dioxide, into this slurry to effect an exothermic carbonation reaction between the slurry and the carbon dioxide, continuing this exothermic reaction on a gradually increasing temperature scale to an equilibrium value of about 50° C. to 60° C. until substantially all of the lime has been converted into calcium carbonate of a non-colloidal form.

MILTON O. SCHUR.
ROBERT M. LEVY.

REFERENCES CITED

The following references are of record in the file of this patent:

UNITED STATES PATENTS

| Number | Name | Date |
|---|---|---|
| 2,058,503 | Rafton et al. | Oct. 27, 1936 |
| 2,081,112 | Statham et al. | May 18, 1937 |
| 2,140,375 | Allen et al. | Dec. 13, 1938 |
| 2,386,389 | Elkington et al. | Oct. 9, 1945 |
| 2,442,525 | Wrege et al. | June 1, 1948 |

FOREIGN PATENTS

| Number | Country | Date |
|---|---|---|
| 563,111 | Great Britain | July 31, 1944 |

OTHER REFERENCES

Mellor, "Comp. Treat. On Inorganic and Theor. Chem.," vol. 3, p. 817, 1923, Longman, Greens and Co., N. Y.